United States Patent
Li

(10) Patent No.: US 12,342,350 B2
(45) Date of Patent: Jun. 24, 2025

(54) DATA TRANSMISSION METHODS AND COMMUNICATION DEVICE

(71) Applicant: BEIJING XIAOMI MOBILE SOFTWARE CO., LTD., Beijing (CN)

(72) Inventor: Yuanyuan Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 446 days.

(21) Appl. No.: 17/800,194

(22) PCT Filed: Feb. 20, 2020

(86) PCT No.: PCT/CN2020/076059
§ 371 (c)(1),
(2) Date: Aug. 16, 2022

(87) PCT Pub. No.: WO2021/163969
PCT Pub. Date: Aug. 26, 2021

(65) Prior Publication Data
US 2023/0071861 A1  Mar. 9, 2023

(51) Int. Cl.
*H04W 72/23* (2023.01)
*H04L 5/00* (2006.01)
*H04W 36/00* (2009.01)

(52) U.S. Cl.
CPC ........... *H04W 72/23* (2023.01); *H04L 5/0094* (2013.01); *H04L 5/0044* (2013.01); *H04W 36/0085* (2018.08); *Y02D 30/70* (2020.08)

(58) Field of Classification Search
CPC .............. H04W 72/23; H04W 36/0085; H04L 5/0094; H04L 5/0044; Y02D 30/70
See application file for complete search history.

(56) References Cited

U.S. PATENT DOCUMENTS

| 2019/0021017 A1* | 1/2019 | Nagaraja | H04W 72/51 |
| 2019/0268883 A1* | 8/2019 | Zhang | H04L 5/0094 |
| 2021/0298108 A1* | 9/2021 | Wu | H04W 74/0833 |

FOREIGN PATENT DOCUMENTS

| CN | 108541016 A | 9/2018 |
| WO | WO 2019013921 A1 | 1/2019 |

OTHER PUBLICATIONS

Indian Patent Application No. 202247051384 Office Action dated Apr. 28, 2023, 5 pages.

* cited by examiner

*Primary Examiner* — Kwang B Yao
*Assistant Examiner* — Bradley D Lytle, Jr.
(74) *Attorney, Agent, or Firm* — Cozen O'Connor

(57) ABSTRACT

A method for data transmission includes, in response to first physical uplink shared channel (PUSCH) resources having a first priority, maintaining downlink communication with a serving cell within a first duration after the end moment of the first PUSCH resource, wherein the first duration is a duration between the end moment of the first PUSCH resources and the end moment of a predetermined downlink control information (DCI) monitoring occasion, and the DCI monitoring occasion is the first DCI monitoring occasion after a second duration from the end moment of the first PUSCH resource.

17 Claims, 5 Drawing Sheets

DATA TRANSMISSION METHODS AND COMMUNICATION DEVICE

CROSS-REFERENCE TO RELATED APPLICATION

This application is the U.S. national phase application of International Application No. PCT/CN2020/076059, filed on Feb. 20, 2020, the entire disclosure of which is incorporated herein by reference for all purposes.

TECHNICAL FIELD

The disclosure relates to a field of wireless communication technologies, but is not limited to the field of wireless communication technologies, and more particularly, to a method and an apparatus for data transmission, and a communication device.

BACKGROUND

In a New Radio (NR) system for 5th generation (5G) cellular mobile communication technology, a user equipment (UE) needs to periodically measure reference signals of neighboring cells during mobility measurement. When a receiver bandwidth of the UE is not enough to cover the frequency of the serving cell and the frequency of the adjacent cells at the same time, the UE may measure the adjacent cells at a certain time gap. The base station may configure for the UE a measurement gap of measuring inter-frequency signals. For example, a measurement gap period is every 40 ms, each measurement gap lasts 6 ms, and the offset of the measurement gap configuration is 20 ms. Then, 20-25 ms, 60-65 ms and 100-105 ms are measurement gaps. Here, the neighboring cells may be inter-frequency cells.

For an inter-frequency cell, the UE may also monitor a synchronized signal block (SSB) of the inter-frequency cell. The base station may perform SSB measurement timing configuration (SMTC) settings for the UE. The configuration content of SMTC includes: a monitoring period, an offset, a duration, and a cell identity (ID) of the monitored SSB. The UE may monitor the SSB of the inter-frequency cell within a specified duration. For example, when the monitoring period is 300 ms, the displacement is 40 ms, and the duration is 5 ms, the UE period monitors the SSB of the neighboring cell at times such as 40-44 ms, 120-124 ms, and 200-204 ms.

SUMMARY

According to a first aspect of the disclosure, there is provided a method for data transmission, which is applied to a user equipment (UE). The method includes: in response to first physical uplink shared channel (PUSCH) resources being with a first priority, maintaining downlink communication with a serving cell within a first duration after an end moment of the first PUSCH resource. The first duration is a duration from the end moment of the first PUSCH resource to an end moment of a predetermined downlink control information (DC) monitoring occasion. The predetermined DCI monitoring occasion is a first DCI monitoring occasion after a second duration separated from the end moment of the first PUSCH resource.

According to a second aspect of the disclosure, there is provided a method for data transmission, which is applied to a base station. The method includes: in response to first physical uplink shared channel (PUSCH) resources being with a first priority, maintaining downlink communication with a user equipment (UE) in a serving cell within a first duration after an end moment of the first PUSCH resources. The first duration is a duration from the end moment of the first PUSCH resources to an end moment of a predetermined downlink control information (DCI) monitoring occasion. The predetermined DCI monitoring occasion is a first DCI monitoring occasion after a second duration separated from the end moment of the first PUSCH resources.

According to a third aspect of the disclosure, there is provided a communication device. The device includes: a processor and a non-transitory computer-readable storage medium coupled to the processor and storing programming instructions for execution by the processor. The programming instructions instruct the processor to: in response to first physical uplink shared channel (PUSCH) resources being with a first priority, maintaining downlink communication with a serving cell within a first duration after an end moment of the first PUSCH resources. The first duration is a duration from the end moment of the first PUSCH resources to an end moment of a predetermined downlink control information (DCI) monitoring occasion. The predetermined DCI monitoring occasion is a first DCI monitoring occasion after a second duration separated from the end moment of the first PUSCH resources.

It should be understood that the above general description and the following detailed description are and explanatory, and are not restrictive of the disclosure.

BRIEF DESCRIPTION OF THE DRAWINGS

The accompanying drawings here, which are incorporated in and constitute a part of this specification, illustrate embodiments consistent with the disclosure and serve to explain the principles of the disclosure together with the specification.

DETAILED DESCRIPTION

Embodiments will be described in detail herein, examples of which are illustrated in the accompanying drawings. Where the following description refers to the drawings, the same numerals in different drawings refer to the same or similar elements unless otherwise indicated. The implementations described in the following embodiments do not represent all implementations consistent with the embodiments of the disclosure. Rather, they are merely examples of apparatuses and methods consistent with some aspects of the embodiments of the disclosure, as recited in the appended claims.

The terms used in the embodiments of the disclosure are for the purpose of describing particular embodiments, and are not intended to limit the embodiments of the disclosure. As used in the embodiments of the disclosure and the appended claims, the singular forms "a", "an," and "the" are intended to include the plural forms as well, unless the context clearly dictates otherwise. It will also be understood that the term "and/or" as used herein refers to and includes any and all possible combinations of one or more of the associated listed items.

It should be understood that although the terms first, second, third, etc. may be used in embodiments of the disclosure to describe various pieces of information, such information should not be limited to these terms. These terms are used to distinguish the same type of information from each other. For example, without departing from the scope of the embodiments of the disclosure, the first information may also be referred to as the second information, and similarly, the second information may also be referred to as the first information. Depending on the context, the words "if" and "in case" as used herein may be interpreted as "at the time of . . . " or "when . . . " or "in response to determining . . . ".

Figure 1:
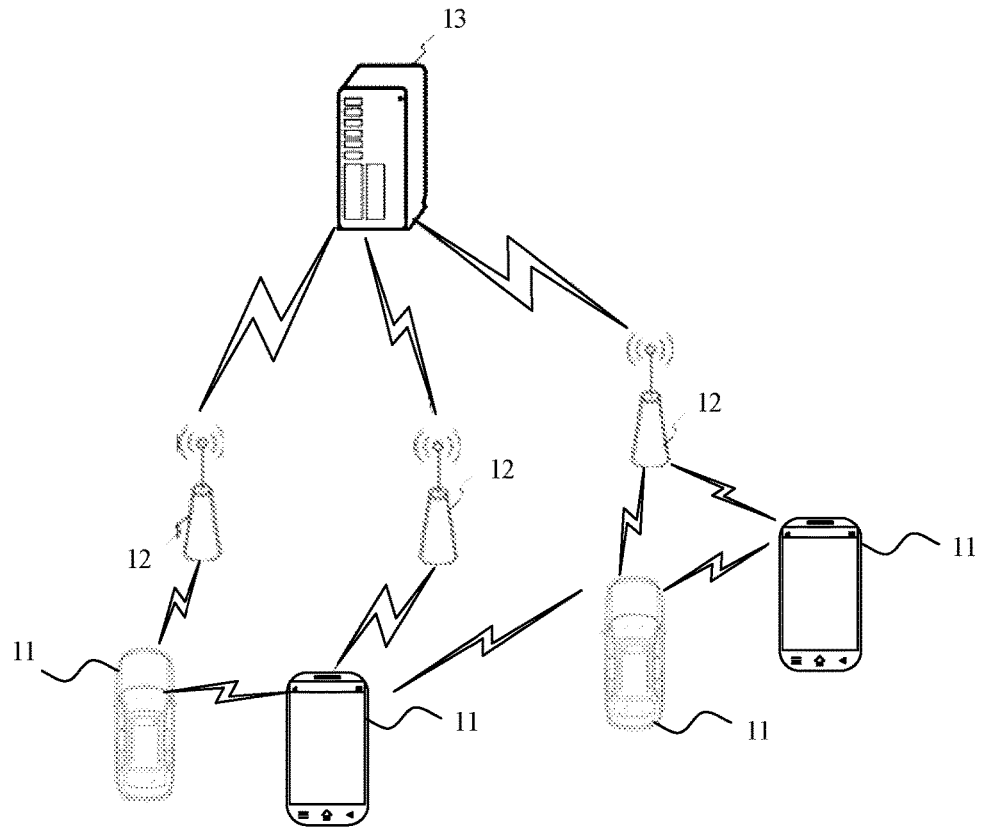
FIG. 1 is a structural schematic diagram of a wireless communication system according to an embodiment.

Referring to FIG. 1, it shows a structural schematic diagram of a wireless communication system according to an embodiment of the disclosure. As shown in FIG. 1, the wireless communication system is a communication system based on cellular mobile communication technology. The wireless communication system may include: several terminals 11 and several base stations 12.

The terminal 11 may be a device that provides voice and/or data connectivity to a user. The terminal 11 may communicate with one or more core networks via a radio access network (RAN). The terminal 11 may be an Internet of Things (IoT) terminal such as a sensor device, a mobile phone (also referred to as a "cellular" phone), and a computer with the IoT terminal. For example, the terminal 11 may be a fixed, portable, pocket, hand-held, built-in computer or a vehicle-mounted apparatus. For example, the terminal 11 may be a station (STA), a subscriber unit, a subscriber station, a mobile station, a mobile, a remote station, an access point, a remote terminal, an access terminal, a user terminal, a user agent, a user device, or a user equipment (UE). Alternatively, the terminal 11 may also be a device of an unmanned aerial vehicle. Alternatively, the terminal 11 may also be a vehicle-mounted device, for example, a trip computer with a wireless communication function, or a wireless communication device connected to the external trip computer. Alternatively, the terminal 11 may also be an infrastructure, for example, a streetlight, a signal light, or other infrastructure with a wireless communication function.

The base station 12 may be a network-side device in a wireless communication system. The wireless communication system may be the 4th generation mobile communication (4G) system, also known as a long term evolution (LTE) system. Alternatively, the wireless communication system may also be a 5G system, also known as new radio (NR) system or 5G NR system. Alternatively, the wireless communication system may also be a next-generation system of the 5G system. The access network in the 5G system may be called a new generation-radio access network (NG-RAN). Alternatively, it is a machine-type communication (MTC) system.

The base station 12 may be an evolved base station (eNB) used in the 4G system. Alternatively, the base station 12 may also be a base station (gNB) that adopts a centralized distributed architecture in a 5G system. When the base station 12 adopts the centralized distributed architecture, it usually includes a central unit (CU) and at least two distributed units (DUs). The CU is provided with protocol stacks of a packet data convergence protocol (PDCP) layer, a radio link control (RLC) protocol layer, and a medium access control (MAC) layer. The DU is provided with a protocol stack of a physical (PHY) layer. The specific implementation of the base station 12 is not limited in this embodiment of the disclosure.

A wireless connection may be established between the base station 12 and the terminal 11 through a wireless air interface. In different embodiments, the wireless air interface is a wireless air interface based on the fourth generation mobile communication network technology (4G) standard or a wireless air interface based on the fifth generation mobile communication network technology (5G) standard. For example, the wireless air interface is a new air interface. Alternatively, the wireless air interface may also be a wireless air interface based on a 5G next-generation mobile communication network technology standard.

In some embodiments, an end-to-end (E2E) connection may also be established between the terminals 11, for example, vehicle-to-vehicle (V2V) communication, vehicle to infrastructure (V2I) communication and vehicle to pedestrian (V2P) communication and other communication scenes in vehicle-to-everything (V2X) communication.

In some embodiments, the above wireless communication system may further include a network management device 13.

Several base stations 12 are respectively connected to the network management device 13. The network management device 13 may be a core network device in a wireless communication system. For example, the network management device 13 may be a mobility management entity (MME) in an evolved packet core (EPC). Alternatively, the network management device may also be other core network devices, such as a serving gateway (SGW), a public data network gateway (PGW), a policy and charging rules function (PCRF) or a home subscriber server (HSS), etc. The implementation of the network management device 13 is not limited in this embodiment of the disclosure.

The execution subject involved in the embodiments of the present disclosure includes, but is not limited to, a user equipment (UE) and a base station that communicate with the 5G NR technology.

An application scenario of the embodiments of the present disclosure is that in 5G NR, certain service types need requests of ultra-high reliability and low latency, such as the ultra-reliable low latency communication (URLLC) service type. The URLLC service has a high priority, and usually requires a sender to send data and retransmit data as soon as possible, so as to reduce the air interface transmission delay. In the URLLC discussion in the release R15, it has been determined that the priority of PUSCH resources may be distinguished at the physical layer. For the semi-statically configured PUSCH, RRC configuration parameters are used to directly configure the priority. For the dynamically scheduled PUSCH, a physical layer indication or signal, such as 1 bit in downlink control information (DCI) is used to indicate the priority. The URLLC uplink service shall generally be transmitted using high-priority PUSCH resources.

When the UE sends URLLC service data uplink using PUSCH resources before the measurement gap, and the base station has not finished demodulation when the UE enters the measurement gap, the possible problems are: when the base station fails to demodulate the URLLC service data, the UE cannot receive any downlink signals from the serving cell since the UE has entered the measurement gap, and the base station cannot send an uplink grant (UL grant) to the UE for scheduling PUSCH resources and retransmitting the URLLC service data. The base station may send the UL grant to the UE for scheduling and retransmitting after the measurement gap ends. Therefore, the uplink data transmission delay may be increased. Here, the measurement gap includes: a measurement gap and an SSB measurement timing configuration (SMTC).

Figure 2:
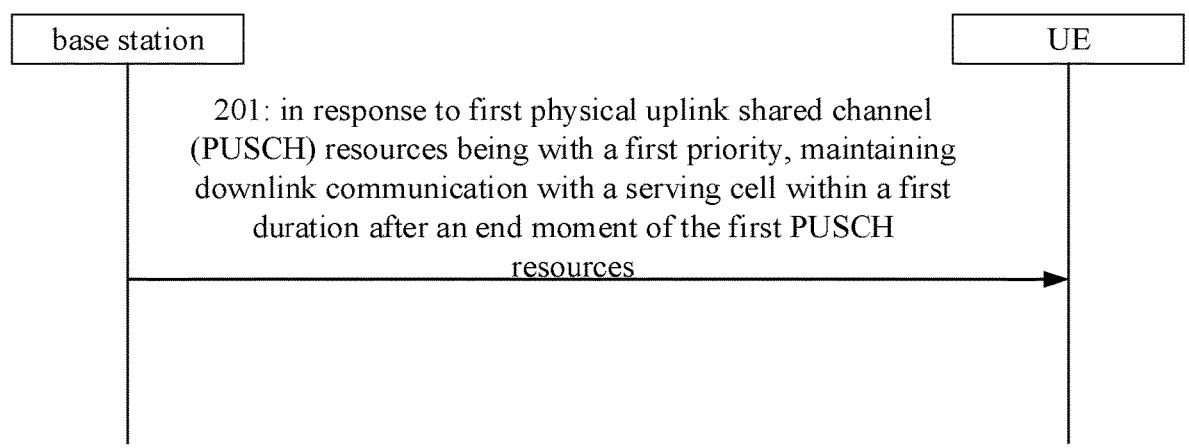
FIG. 2 is a schematic flowchart of a method for data transmission according to an embodiment.

As shown in FIG. 2, the embodiment provides a data transmission method, which may be applied to a user equipment (UE) in wireless communication. The data transmission method may include the following step at 201.

At 201, in response to first physical uplink shared channel (PUSCH) resources being with a first priority, downlink communication with a serving cell is maintained within a first duration after an end moment of the first PUSCH resources.

The first duration is a duration from the end moment of the first PUSCH resources to an end moment of a predetermined downlink control information (DCI) monitoring occasion.

The predetermined DCI monitoring occasion is a first DCI monitoring occasion after a second duration separated from the end moment of the first PUSCH resources.

The PUSCH resources with the first priority may be used to transmit service data with a higher priority, such as downlink data service that requires a shorter delay, such as the URLLC service data and the like. The second priority has a lower priority than the first priority. The service data transmitted by the PUSCH resources with the second priority has a lower latency demand than the service data transmitted by the PUSCH resources with the first priority.

Here, the UE may monitor the UL grant sent by the base station in the serving cell through a physical downlink control channel (PDCCH) of a downlink at the DCI monitoring occasion. The UL grant may be used to schedule newly transmitted data or re-transmitted data.

The base station may determine whether the data transmitted by using the PUSCH resources with the first priority is successfully received. If the reception fails, the base station may send the UL grant at the DCI monitoring occasion, so as to request the UE to retransmit the data through the UL grant. The measurement gap may be a periodic measurement period configured by the base station for the UE to perform inter-frequency signal measurement. When the receiver bandwidth of the UE is insufficient to cover signal frequency points of both the serving cell and the inter-frequency cell, the UE cannot measure inter-frequency signals in the inter-frequency cell and perform data transmission in the serving cell at the same time. During the measurement gap, normal transmission and reception of data services between the UE and the serving cell may be interrupted. The inter-frequency signal may be a signal different from the center frequency of the serving cell where the UE is currently located, may also be a signal from an inter-frequency cell at other band width parts (BWPs) that are different from the currently occupied BWP of the UE, etc., and may also be a signal from an inter-frequency cell with a different center frequency or a different sub-carrier space (SCS) in SSB measurement. The inter-frequency signal measurement may be performing signal quality measurement on the inter-frequency signal or monitoring the inter-frequency signal. When the DCI monitoring occasion corresponding to the UL grant sent by the base station for scheduling retransmission data overlaps with the measurement gap, the base station cannot send the UL grant. In this way, the data transmission may be delayed.

Here, the predetermined DCI monitoring occasion may be a DCI monitoring occasion at which the base station may send an UL grant for scheduling retransmission data. The UE may set that the inter-frequency signal measurement is not performed between the end moment of the first PUSCH resources and the end moment of the predetermined DCI monitoring occasion. That is, the inter-frequency signal measurement is not performed within the first duration after the end moment of the first PUSCH resources and the downlink communication with the serving cell is maintained for the first duration. The first PUSCH resources may be located outside the measurement gap or within the measurement gap in a time domain.

During the first duration, the UE maintains downlink communication with the serving cell and no longer switches to the inter-frequency cell. When the UE maintains downlink communication with the serving cell, the UE may receive a downlink signal sent by the serving cell to the UE through the downlink, or may monitor a downlink signal from the serving cell on the downlink, etc. The downlink signal includes, but is not limited to, control instructions and downlink data sent by the serving cell to the UE. In this way, when the base station fails to receive data within the first duration, the base station may send the UL grant for requesting retransmission data through the downlink without being affected by the measurement gap, and the UE may receive the UL grant for requesting the retransmission data, which further reduces the delay of data transmission.

The base station may maintain downlink communication with the UE in the serving cell within the first duration after the end moment of the first PUSCH resources. In this way, when the base station determines that receiving the data transmitted by using the PUSCH resources with the first priority fails, the base station may send the UL grant for scheduling retransmission data at the predetermined DCI monitoring occasion, and the UE may retransmit the data that the base station fails to receive.

The second duration may be a duration needed by the base station to determine whether the data transmitted by using the PUSCH resources with the first priority is successfully received. The base station determines whether the data is successfully received within the second duration, and when the reception fails, the base station sends the UL grant for scheduling retransmission data at the first DCI monitoring occasion after the second duration ends. The UE may monitor whether there is an UL grant for scheduling retransmission data at the first DCI monitoring occasion after the second duration ends, and may retransmit the data by using the PUSCH resources. In this way, the UL grant for scheduling retransmission data is sent at the first DCI monitoring occasion after it is determined that the retransmission is needed, which may reduce the delay of uplink data and meet the demand for low-latency data transmission.

In this way, the UE may receive a transmission request of the base station for the uplink data by using the PUSCH resources with the first priority within the first duration, without being affected by the measurement gap, so as to reduce the possibility of failing to receive the transmission request due to the inter-frequency signal measurement during the measurement gap, reduce the delay of uplink data by using the PUSCH resources with the first priority for uplink data, and meet the demand for low-latency service transmission.

In an embodiment, the second duration is greater than or equal to a duration for which the base station demodulates data transmitted by the first PUSCH resources.

The second duration may be the duration needed by the base station to demodulate the data transmitted by using the PUSCH resources with the first priority. The base station determines whether the data is successfully demodulated within the second duration, and when the demodulation fails, the base station sends an UL grant for scheduling retransmission data at the first DCI monitoring occasion after the second duration ends. The UE may monitor whether there is an UL grant for scheduling retransmitted data at the first DCI monitoring occasion after the second duration ends, and retransmit the data by using the PUSCH resources. In this way, the UL grant for scheduling the retransmission data is sent at the first DCI monitoring occasion after it is determined that retransmission is needed, which may reduce the delay of uplink data and meet the demand for low-latency data transmission.

Figure 3:
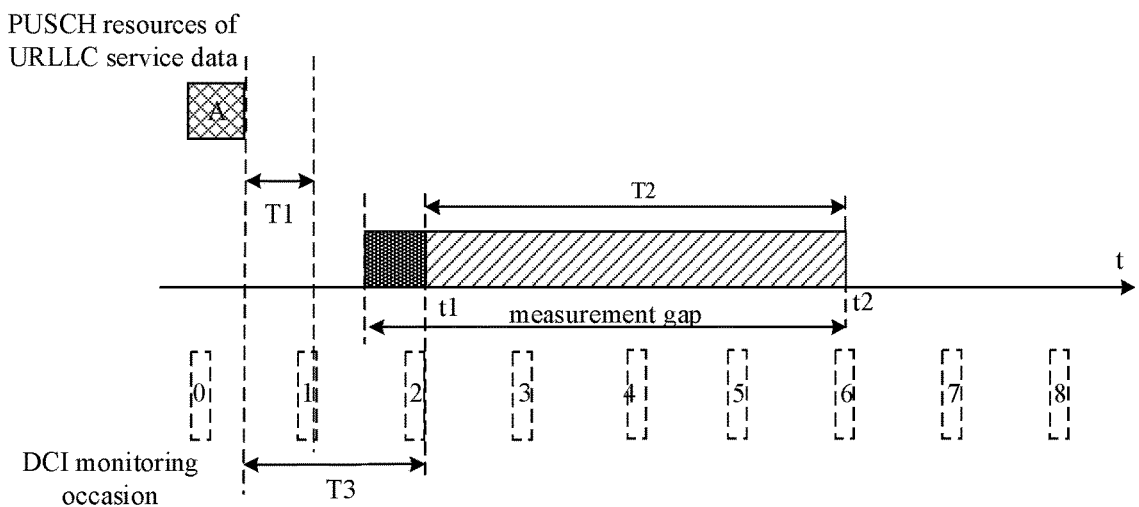
FIG. 3 is a schematic diagram illustrating a timing sequence of PUSCH resources and measurement gaps according to an embodiment.

In some examples, as shown in FIG. 3, PUSCH resource A is used by the UE to transmit uplink URLLC service data, and there is a DCI monitoring occasion 1 between the end moment of PUSCH resource A and a start moment of the measurement gap. The second duration T1 is needed by the base station to demodulate the URLLC service data. When the base station demodulation fails, since the start moment of the DCI monitoring occasion 1 is earlier than the end moment of the second duration T1, the base station has been unable to send the UL grant for scheduling retransmission data at the DCI monitoring occasion 1. The base station sends an UL grant for scheduling retransmission data at the first DCI monitoring occasion after T1 (that is, DCI monitoring occasion 2). From the end moment of PUSCH resource A to the end moment of DCI monitoring occasion 2, that is, within the second duration from the end moment of PUSCH resource A, the base station maintains downlink communication with the UE in the serving cell, so that the UE may receive the UL grant for retransmitted data at the DCI monitoring occasion 2, and the retransmitted data may be transmitted through the PUSCH resources.

Figure 4:
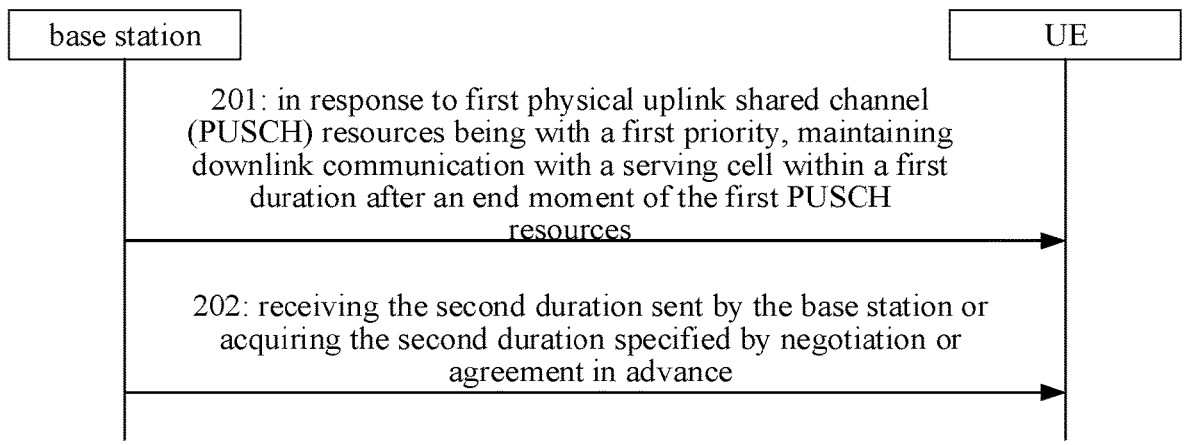
FIG. 4 is a schematic flowchart of another method for data transmission according to an embodiment.

In an embodiment, as shown in FIG. 4, the data transmission method may further include the following step at 202.

At 202, the second duration sent by the base station is received, or the second duration specified by negotiation or agreement in advance is acquired.

The base station may configure the second duration for the UE through a high-layer signaling or the like. For example, the second duration may be configured through a radio resource control (RRC) signaling. The indication information for indicating the second duration may be set in the RRC signaling by adding RRC parameters or the like.

The base station and the UE may also negotiate in advance or determine the second duration according to a communication protocol or the like.

In an embodiment, the step at 201 may include one of:
in response to the first PUSCH resources being with the first priority and in response that there is no DCI monitoring occasion in the first time interval between the end moment of the first PUSCH resources and the start moment of a measurement gap adjacent to the first PUSCH resources, maintaining downlink communication with the serving cell for the first duration after the end moment of first PUSCH resources; and in response to the first PUSCH resources being with the first priority, and a time interval from the end moment of the first PUSCH resources to any DCI monitoring occasion within the first time interval being less than the second duration, maintaining downlink communication with the serving cell for the first duration after the end moment of first PUSCH resources.

When the first time interval between the end moment of the first PUSCH resources and the start moment of the measurement gap adjacent to the first PUSCH resources does not include a DCI monitoring occasion, it is not possible to send an UL grant for scheduling retransmission data within the first time interval if the base station fails to demodulate the data transmitted by using the first PUSCH resources. Therefore, within the first duration after the end moment of the first PUSCH resources, the UE maintains downlink communication with the serving cell, so that the base station has enough time to perform data demodulation, and sends the UL grant for scheduling retransmission data at the first DCI monitoring occasion after the demodulation is completed.

When a time interval from the end moment of the first PUSCH resources to any DCI monitoring occasion within the first time interval is less than the second duration, the base station has not completed data demodulation when a DCI monitoring occasion within the first time interval occurs, and it is not possible to send the UL grant for scheduling retransmission data at the DCI monitoring occasion within the first time interval. Therefore, within the first duration after the end moment of the first PUSCH resources, the UE maintains downlink communication with the serving cell, so that the base station has enough time to perform data demodulation, and sends the UL grant for scheduling retransmission data at the first DCI monitoring occasion after the demodulation is completed.

In this way, on the one hand, the base station may send the UL grant for scheduling retransmission data at the DCI monitoring occasion without being affected by the measurement gap; on the other hand, the base station may send the UL grant for scheduling retransmission data at the first DCI monitoring occasion after demodulation is completed. As such, the transmission efficiency is improved and the delay is reduced.

In an embodiment, the first PUSCH resources include: first PUSCH resources of newly transmitted data that is scheduled by a UL grant and is monitored at a DCI monitoring occasion; or first PUSCH resources of retransmission data that is scheduled by a UL grant and is monitored at a DCI monitoring occasion.

Here, the first PUSCH resources may be used to transmit the newly transmitted data or retransmitted data. The newly transmitted data or the retransmitted data may be the data scheduled by the UL grant within the DCI monitoring occasion. In this way, the base station may send the UL grant for scheduling retransmission data at the DCI monitoring occasion, without being affected by the measurement gap, thus reducing the data transmission delay.

In an embodiment, the data transmission method may further include: in response that the end moment of the predetermined DCI monitoring occasion is within the measurement gap and the end moment of the predetermined DCI monitoring occasion has not yet reached the end moment of the measurement gap, performing inter-frequency signal measurement between the end moment of the predetermined DCI monitoring occasion and the end moment of the measurement gap.

As shown in FIG. 3, the end moment of the DCI monitoring occasion 2 is t1, the end moment of the measurement gap is t2, where t1 is within the measurement gap, and t1 to t2 is still in the measurement gap. Therefore, the UE may perform inter-frequency signal measurement between t1 and t2. The base station may interrupt the downlink communication with the UE in the serving cell between t1 and t2.

In this way, the inter-frequency signal measurement may be performed on remaining time of the measurement gap, thus improving the utilization rate of the remaining time of the measurement gap.

In an embodiment, performing inter-frequency signal measurement between the end moment of the predetermined DCI monitoring occasion and the end moment of the measurement gap, includes: in response to a time difference between the end moment of the predetermined DCI monitoring occasion and the end moment of the measurement gap being greater than a third duration, performing inter-frequency signal measurement between the end moment of the predetermined DCI monitoring occasion and the end moment of the measurement gap.

The UE receiver needs certain handover time when switching between the signal frequency point of the serving cell and the signal frequency point of the inter-frequency cell, which is a duration for which one frequency point switching is performed by the UE. Therefore, when the time difference between the end moment of the predetermined DCI monitoring occasion and the end moment of the measurement gap is less than twice the inter-frequency handover time, the UE cannot switch back to the frequency point of the serving cell in time after the end moment of the measurement gap. That is, the UE cannot switch back to the serving cell in time for communication, thus causing useless handover operations and even delaying downlink communication in the serving cell. Therefore, in order to avoid the above situations as much as possible, the base station may configure a third duration at least based on the handover time. The third duration may be greater than or equal to twice the inter-frequency handover time.

In a specific embodiment, the base station may configure the duration threshold based on factors other than the frequency handover time of the UE. For example, the other factors include: a resource configuration state of the system, a global configuration of the base station and/or a channel quality, and the like.

Enabling the third duration to be greater than or equal to twice the inter-frequency handover time provides a basis for evaluating whether the UE may perform inter-frequency handover for two times. On the one hand, the remaining period of the measurement gap may be effectively used for inter-frequency signal measurement, and on the other hand, the situation that the UE cannot be switched back to the serving cell in time may be reduced, thus reducing the invalid inter-frequency handover.

In some examples, as shown in FIG. 3, the duration from t1 to t2 is longer than the second duration T2. When the inter-frequency signal measurement is performed between t1 and t2, the UE may switch to the serving cell frequency for downlink communication starting from the time point t2 since the UE needs to perform frequency handover for two times, considering the time occupied by the inter-frequency signal measurement and the inter-frequency handover duration of the UE. Therefore, the UE may perform inter-frequency signal measurement during the duration from t1 to t2, and the base station interrupts downlink communication with UE in the serving cell.

In this way, the inter-frequency signal measurement may be performed on the remaining time of the measurement gap, thus improving the utilization rate of the remaining time of the measurement gap.

In an embodiment, the data transmission method may further include: in response to determining that the time difference between the end moment of the predetermined DCI monitoring occasion and the end moment of the measurement gap is less than or equal to the third duration, maintaining downlink communication with the serving cell between the end moment of the predetermined DCI monitoring occasion and the end moment of the measurement gap.

When the time difference between the end moment of the predetermined DCI monitoring occasion and the end moment of the measurement gap is less than or equal to the third duration, the UE cannot switch back to the frequency point of the serving cell in time after the end of the measurement gap, that is, the UE cannot switch back to the serving cell in time for communication, thus causing useless handover operations and even delaying downlink communication in the serving cell.

When the time difference between the end moment of the predetermined DCI monitoring occasion and the end moment of the measurement gap is less than or equal to the third duration, the UE may maintain downlink communication with the serving cell. The third duration may be set by the base station through a high-layer signaling.

In some examples, as shown in FIG. 3, the duration from t1 to t2 is less than or equal to the third duration T2. When inter-frequency signal measurement is performed between t1 and t2, since the UE needs to perform frequency handover for two times, considering the time occupied by the inter-frequency signal measurement and the inter-frequency handover duration of the UE, it may be determined that the UE cannot switch to the frequency point of the serving cell for downlink communication from the time point t2. Therefore, the UE may maintain receiving downlink information on the serving cell and do not perform inter-frequency signal measurement in the time period from t1 to t2.

In this way, it is possible to reduce the situation that the UE cannot switch to the frequency point of the serving cell in time for downlink communication after the measurement gap ends. The reliability of receiving downlink data is improved during the transmission period. At the same time, the invalid frequency handover may be reduced.

In an embodiment, the third duration is greater than or equal to a duration of the UE performing inter-frequency handover for two times.

The UE switches receiving downlink data from the serving cell to performing inter-frequency signal measurement at frequency points of the inter-frequency cell, then switches to the downlink communication performed by the serving cell. The UE receiver needs to switch from signal frequency points of the serving cell to frequency points of the inter-frequency cell, and switch from the frequency points of the inter-frequency cell to the frequency points of the serving cell again. The UE needs to perform processing such as configuration on the receiver. Therefore, the third duration may be greater than or equal to twice the inter-frequency handover duration of the UE.

Figure 5:
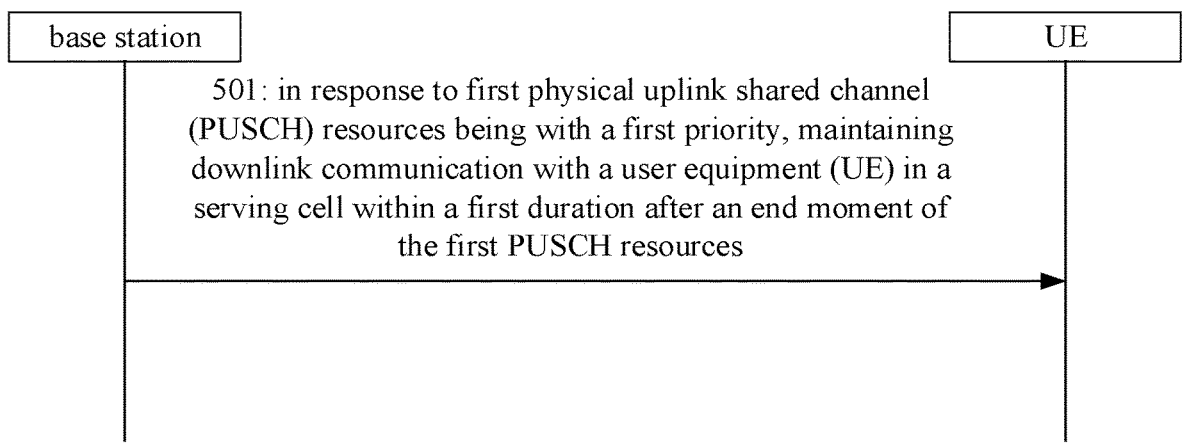
FIG. 5 is a schematic flowchart of a method for data transmission according to an embodiment.

As shown in FIG. 5, a data transmission method is provided according to an embodiment, which may be applied to a base station of wireless communication. The data transmission method may include the following step at 501.

At 501, in response to first physical uplink shared channel (PUSCH) resources being with a first priority, downlink communication is maintained with a user equipment (UE) in a serving cell within a first duration after an end moment of the first PUSCH resources.

The first duration is a duration from the end moment of the first PUSCH resources to an end moment of a predetermined downlink control information (DCI) monitoring occasion.

The predetermined DCI monitoring occasion is a first DCI monitoring occasion after a second duration separated from the end moment of the first PUSCH resources.

The PUSCH resources with the first priority may be used to transmit service data with a higher priority, such as downlink data service that requires a shorter delay, such as the URLLC service data and the like. The second priority has a lower priority than the first priority. The service data transmitted by the PUSCH resources with the second priority has a lower latency demand than the service data transmitted by the PUSCH resources with the first priority.

Here, the UE may monitor the UL grant sent by the base station in the serving cell through a physical downlink control channel (PDCCH) of a downlink at the DCI monitoring occasion. The UL grant may be used to schedule newly transmitted data or re-transmitted data.

The base station may determine whether the data transmitted by using the PUSCH resources with the first priority is successfully received. If the reception fails, the base station may send the UL grant at the DCI monitoring occasion, so as to request the UE to retransmit the data through the UL grant.

The measurement gap may be a periodic measurement period configured by the base station for the UE to perform inter-frequency signal measurement. When the receiver bandwidth of the UE is insufficient to cover signal frequency points of both the serving cell and the inter-frequency cell, the UE cannot measure inter-frequency signals in the inter-frequency cell and perform data transmission in the serving cell at the same time. During the measurement gap, normal transmission and reception of data services between the UE and the serving cell may be interrupted. The inter-frequency signal may be a signal different from the center frequency of the serving cell where the UE is currently located, may also be a signal from an inter-frequency cell at other band width parts (BWPs) that are different from the currently occupied BWP of the UE, etc., and may also be a signal from an inter-frequency cell with a different center frequency or a different sub-carrier space (SCS) in SSB measurement. The inter-frequency signal measurement may be performing signal quality measurement on the inter-frequency signal or monitoring the inter-frequency signal. When the DCI monitoring occasion corresponding to the UL grant sent by the base station for scheduling retransmission data overlaps with the measurement gap, the base station cannot send the UL grant. In this way, the data transmission may be delayed.

Here, the predetermined DCI monitoring occasion may be a DCI monitoring occasion at which the base station may send an UL grant for scheduling retransmission data. The UE may set that the inter-frequency signal measurement is not performed between the end moment of the first PUSCH resources and the end moment of the predetermined DCI monitoring occasion. That is, the inter-frequency signal measurement is not performed within the first duration after the end moment of the first PUSCH resources and the downlink communication with the serving cell is maintained for the first duration. The first PUSCH resources may be located outside the measurement gap or within the measurement gap in a time domain.

During the first duration, the UE maintains downlink communication with the serving cell and no longer switches to the inter-frequency cell. When the UE maintains downlink communication with the serving cell, the UE may receive a downlink signal sent by the serving cell to the UE through the downlink, or may monitor a downlink signal from the serving cell on the downlink, etc. The downlink signal includes, but is not limited to, control instructions and downlink data sent by the serving cell to the UE. In this way, when the base station fails to receive data within the first duration, the base station may send the UL grant for requesting retransmission data through the downlink without being affected by the measurement gap, and the UE may receive the UL grant for requesting the retransmission data, which further reduces the delay of data transmission. The base station may maintain downlink communication with the UE in the serving cell within the first duration after the end moment of the first PUSCH resources. In this way, when the base station determines that receiving the data transmitted by using the PUSCH resources with the first priority fails, the base station may send the UL grant for scheduling retransmission data at the predetermined DCI monitoring occasion, and the UE may retransmit the data that the base station fails to receive.

The second duration may be a duration needed by the base station to determine whether the data transmitted by using the PUSCH resources with the first priority is successfully received. The base station determines whether the data is successfully received within the second duration, and when the reception fails, the base station sends the UL grant for scheduling retransmission data at the first DCI monitoring occasion after the second duration ends. The UE may monitor whether there is an UL grant for scheduling retransmission data at the first DCI monitoring occasion after the second duration ends, and may retransmit the data by using the PUSCH resources. In this way, the UL grant for scheduling retransmission data is sent at the first DCI monitoring occasion after it is determined that the retransmission is needed, which may reduce the delay of uplink data and meet the demand for low-latency data transmission.

In this way, the UE may receive a transmission request of the base station for the uplink data by using the PUSCH resources with the first priority within the first duration, without being affected by the measurement gap, so as to reduce the possibility of failing to receive the transmission request due to the inter-frequency signal measurement during the measurement gap, reduce the delay of uplink data by using the PUSCH resources with the first priority for uplink data, and meet the demand for low-latency service transmission.

In an embodiment, the second duration is greater than or equal to a duration for which the base station demodulates data transmitted by the first PUSCH resources. The second duration may be the duration needed by the base station to demodulate the data transmitted by using the PUSCH resources with the first priority. The base station determines whether the data is successfully demodulated within the second duration, and when the demodulation fails, the base station sends an UL grant for scheduling retransmission data at the first DCI monitoring occasion after the second duration ends. The UE may monitor whether there is an UL grant for scheduling retransmitted data at the first DCI monitoring occasion after the second duration ends, and retransmit the data by using the PUSCH resources. In this way, the UL grant for scheduling the retransmission data is sent at the first DCI monitoring occasion after it is determined that retransmission is needed, which may reduce the delay of uplink data and meet the demand for low-latency data transmission.

Figure 6:
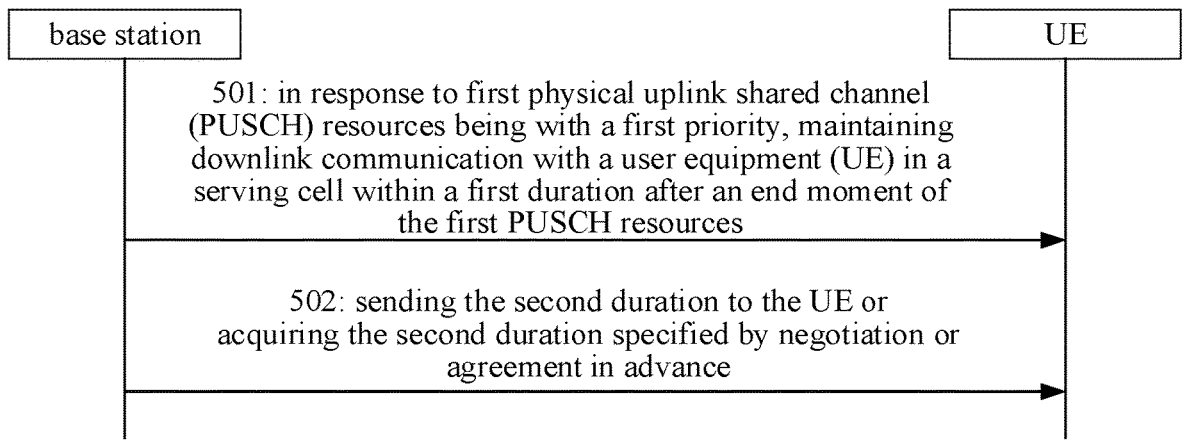
FIG. 6 is a schematic flowchart of another method for data transmission according to an embodiment.

In some examples, as shown in FIG. 3, PUSCH resource A is used by the UE to transmit uplink URLLC service data, and there is a DCI monitoring occasion 1 between the end moment of PUSCH resource A and a start moment of the measurement gap. The second duration T1 is needed by the base station to demodulate the URLLC service data. When the base station demodulation fails, since the start moment of the DCI monitoring occasion 1 is earlier than the end moment of the second duration T1, the base station has been unable to send the UL grant for scheduling retransmission data at the DCI monitoring occasion 1. The base station sends an UL grant for scheduling retransmission data at the first DCI monitoring occasion after T1 (that is, DCI monitoring occasion 2). From the end moment of PUSCH resource A to the end moment of DCI monitoring occasion 2, that is, within the second duration from the end moment of PUSCH resource A, the base station maintains downlink communication with the UE in the serving cell, so that the UE may receive the UL grant for retransmitted data at the DCI monitoring occasion 2, and the retransmitted data may be transmitted through the PUSCH resources. In an embodiment, as shown in FIG. 6, the data transmission method may further include the following step at 502.

At 502, the second duration is sent to the UE; or the second duration specified by negotiation or agreement in advance is acquired.

The base station may configure the second duration for the UE through a high-layer signaling or the like. For example, the second duration may be configured through a radio resource control (RRC) signaling. The indication information for indicating the second duration may be set in the RRC signaling by adding RRC parameters or the like.

The base station and the UE may also negotiate in advance or determine the second duration according to a communication protocol or the like.

In an embodiment, the step at 501 may include one of:

in response to the first PUSCH resources being with the first priority and in response that there is no DCI monitoring occasion in the first time interval between the end moment of the first PUSCH resources and the start moment of a measurement gap adjacent to the first PUSCH resources, maintaining downlink communication with the serving cell for the first duration after the end moment of first PUSCH resources; and in response to the first PUSCH resources being with the first priority, and a time interval from the end moment of the first PUSCH resources to any DCI monitoring occasion within the first time interval being less than the second duration, maintaining downlink communication with the serving cell for the first duration after the end moment of first PUSCH resources.

When the first time interval between the end moment of the first PUSCH resources and the start moment of the measurement gap adjacent to the first PUSCH resources does not include a DCI monitoring occasion, it is not possible to send an UL grant for scheduling retransmission data within the first time interval if the base station fails to demodulate the data transmitted by using the first PUSCH resources. Therefore, within the first duration after the end moment of the first PUSCH resources, the UE maintains downlink communication with the serving cell, so that the base station has enough time to perform data demodulation, and sends the UL grant for scheduling retransmission data at the first DCI monitoring occasion after the demodulation is completed.

When a time interval from the end moment of the first PUSCH resources to any DCI monitoring occasion within the first time interval is less than the second duration, the base station has not completed data demodulation when a DCI monitoring occasion within the first time interval occurs, and it is not possible to send the UL grant for scheduling retransmission data at the DCI monitoring occasion within the first time interval. Therefore, within the first duration after the end moment of the first PUSCH resources, the UE maintains downlink communication with the serving cell, so that the base station has enough time to perform data demodulation, and sends the UL grant for scheduling retransmission data at the first DCI monitoring occasion after the demodulation is completed.

In this way, on the one hand, the base station may send the UL grant for scheduling retransmission data at the DCI monitoring occasion without being affected by the measurement gap; on the other hand, the base station may send the UL grant for scheduling retransmission data at the first DCI monitoring occasion after demodulation is completed. As such, the transmission efficiency is improved and the delay is reduced.

In an embodiment, the first PUSCH resources include: first PUSCH resources of newly transmitted data that is scheduled by a UL grant sent at a DCI monitoring occasion, or first PUSCH resources of retransmission data that is scheduled by the UL grant sent at the DCI monitoring occasion.

Here, the first PUSCH resources may be used to transmit the newly transmitted data or retransmitted data. The newly transmitted data or the retransmitted data may be the data scheduled by the UL grant within the DCI monitoring occasion. In this way, the base station may send the UL grant for scheduling retransmission data at the DCI monitoring occasion, without being affected by the measurement gap, thus reducing the data transmission delay.

In an embodiment, the data transmission method may further include: in response that the end moment of the predetermined DCI monitoring occasion is within the measurement gap and the end moment of the predetermined DCI monitoring occasion has not yet reached the end moment of the measurement gap, interrupting downlink communication with the UE in the serving cell between the end moment of the predetermined DCI monitoring occasion and the end moment of the measurement gap.

As shown in FIG. 3, the end moment of the DCI monitoring occasion 2 is t1, the end moment of the measurement gap is t2, where t1 is within the measurement gap, and t1 to t2 is still in the measurement gap. Therefore, the UE may perform inter-frequency signal measurement between t1 and t2. The base station may interrupt the downlink communication with the UE in the serving cell between t1 and t2.

In this way, the inter-frequency signal measurement may be performed on remaining time of the measurement gap, thus improving the utilization rate of the remaining time of the measurement gap.

In an embodiment, interrupting the downlink communication with the UE in the serving cell between the end moment of the predetermined DCI monitoring occasion and the end moment of the measurement gap, includes: in response to a time difference between the end moment of the predetermined DCI monitoring occasion and the end moment of the measurement gap being greater than a third duration, interrupting the downlink communication with the UE in the serving cell between the end moment of the predetermined DCI monitoring occasion and the end moment of the measurement gap.

The UE receiver needs certain handover time when switching between the signal frequency point of the serving cell and the signal frequency point of the inter-frequency cell, which is a duration for which one frequency point switching is performed by the UE. Therefore, when the time difference between the end moment of the predetermined DCI monitoring occasion and the end moment of the measurement gap is less than twice the inter-frequency handover time, the UE cannot switch back to the frequency point of the serving cell in time after the end moment of the measurement gap. That is, the UE cannot switch back to the serving cell in time for communication, thus causing useless handover operations and even delaying downlink communication in the serving cell. Therefore, in order to avoid the above situations as much as possible, the base station may configure a third duration at least based on the handover time. The third duration may be greater than or equal to twice the inter-frequency handover time. In a specific embodiment, the base station may configure the duration threshold based on factors other than the frequency handover time of the UE. For example, the other factors include: a resource configuration state of the system, a global configuration of the base station and/or a channel quality, and the like. Enabling the third duration to be greater than or equal to twice the inter-frequency handover time provides a basis for evaluating whether the UE may perform inter-frequency handover for two times. On the one hand, the remaining period of the measurement gap may be effectively used for inter-frequency signal measurement, and on the other hand, the situation that the UE cannot be switched back to the serving cell in time may be reduced, thus reducing the invalid inter-frequency handover.

In some examples, as shown in FIG. 3, the duration from t1 to t2 is longer than the second duration T2. When the inter-frequency signal measurement is performed between t1 and t2, the UE may switch to the serving cell frequency for downlink communication starting from the time point t2 since the UE needs to perform frequency handover for two times, considering the time occupied by the inter-frequency signal measurement and the inter-frequency handover duration of the UE. Therefore, the UE may perform inter-frequency signal measurement during the duration from t1 to t2, and the base station interrupts downlink communication with UE in the serving cell.

In this way, the inter-frequency signal measurement may be performed on the remaining time of the measurement gap, thus improving the utilization rate of the remaining time of the measurement gap.

In an embodiment, the data transmission method may further include: in response to the time difference between the end moment of the predetermined DCI monitoring occasion and the end moment of the measurement gap being less than or equal to the third duration, maintaining downlink communication with the UE in the serving cell between the end moment of the predetermined DCI monitoring occasion and the end moment of the measurement gap.

When the time difference between the end moment of the predetermined DCI monitoring occasion and the end moment of the measurement gap is less than or equal to the third duration, the UE cannot switch back to the frequency point of the serving cell in time after the end of the measurement gap, that is, the UE cannot switch back to the serving cell in time for communication, thus causing useless handover operations and even delaying downlink communication in the serving cell.

When the time difference between the end moment of the predetermined DCI monitoring occasion and the end moment of the measurement gap is less than or equal to the third duration, the UE may maintain downlink communication with the serving cell. The third duration may be set by the base station through a high-layer signaling.

In some examples, as shown in FIG. 3, the duration from t1 to t2 is less than or equal to the third duration T2. When inter-frequency signal measurement is performed between t1 and t2, since the UE needs to perform frequency handover for two times, considering the time occupied by the inter-frequency signal measurement and the inter-frequency handover duration of the UE, it may be determined that the UE cannot switch to the frequency point of the serving cell for downlink communication from the time point t2. Therefore, the UE may maintain receiving downlink information on the serving cell and do not perform inter-frequency signal measurement in the time period from t1 to t2.

In this way, it is possible to reduce the situation that the UE cannot switch to the frequency point of the serving cell in time for downlink communication after the measurement gap ends. The reliability of receiving downlink data is improved during the transmission period. At the same time, the invalid frequency handover may be reduced.

In an embodiment, the third duration is greater than or equal to a duration of the UE performing inter-frequency handover for two times.

The UE switches receiving downlink data from the serving cell to performing inter-frequency signal measurement at frequency points of the inter-frequency cell, then switches to the downlink communication performed by the serving cell. The UE receiver needs to switch from signal frequency points of the serving cell to frequency points of the inter-frequency cell, and switch from the frequency points of the inter-frequency cell to the frequency points of the serving cell again. The UE needs to perform processing such as configuration on the receiver. Therefore, the third duration may be greater than or equal to twice the inter-frequency handover duration of the UE.

A specific example is provided below in conjunction with any of the above-mentioned embodiments.

In the example of the disclosure, a method for determining whether a user equipment (UE) may enter a measurement gap is provided. Since processing the SSB measurement timing configuration (SMTC) in the solution is the same as processing the measurement gap, the measurement gap may be used to describe the solution in the following.

For high-priority PUSCH, when there is no DCI monitoring occasion between an end moment of the PUSCH and a start moment of the measurement gap; or when there are one or more DCI monitoring occasions but a time interval between the end moment of the PUSCH resource and the last DCI monitoring occasion is less than T1, the UE may not be able to enter the measurement gap according to a time position of the measurement gap configured by the RRC.

The UE may enter the measurement gap at a DCI monitoring occasion which is located after the duration T1 from the end moment of the PUSCH resources, if the DCI monitoring occasion is still in the measurement gap configured by the RRC at this time.

The above method may prevent the UE from entering the measurement gap when the base station has not finished demodulating the URLLC service data transmitted by using the PUSCH resources. After the base station has finished demodulation of the URLLC service data transmitted by using the PUSCH resources and after the DCI monitoring occasion is encountered, the UE may enter the measurement gap. In this way, it may ensure that the base station has the opportunity of scheduling the UE to retransmit the URLLC service data.

1. T1 is used by the base station to demodulate the URLLC service data transmitted by the PUSCH resources, which may be configured by a high-layer signaling of the base station, or may be directly agreed in a protocol.
2. As shown in FIG. 3, after the duration T1 at the end moment of the PUSCH resources, the DCI monitoring timing is encountered to ensure that the base station may have the opportunity of sending an UL grant after demodulating the URLLC service data, to schedule retransmission of the URLLC service data. In order to ensure that the base station has enough time to generate UL grant information for retransmission data according to a demodulation result of the PUSCH, the start moment of the DCI monitoring occasion should be located after the duration T1 from the end moment of the PUSCH resource.
3. When a time interval between a moment when the UE may start to enter the measurement gap after the DCI monitoring occasion ends and the end moment of the measurement gap configured by RRC signaling is less than T2, the UE may decide not to enter this measurement gap, but keep receiving downlink signals in the serving cell. Considering that when the UE performs inter-frequency measurement, the UE needs to perform frequency point handover, which causes delay. When remaining time of this measurement gap is not much different from the time needed by the frequency point handover (that is, the UE cannot sufficiently perform inter-frequency signal measurement), even if the remaining time of this measurement gap is less than needed by the frequency point handover, there is no need to enter this measurement gap.
4. When a duration of the measurement gap configured by the RRC layer is relatively small, for example, 1.5 ms, the solution according to the above embodiments may not be executed. The UE may directly enter the measurement gap configured by the RRC, and if the retransmission needs to be scheduled, the UE needs to wait until the measurement gap ends before scheduling.

Figure 7:
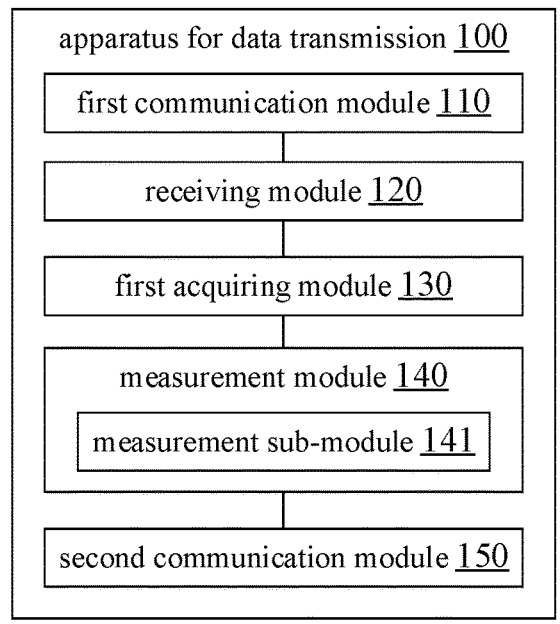
FIG. 7 is a structural block diagram illustrating the composition of an apparatus for data transmission according to an embodiment.

A data transmission apparatus is further provided according to an embodiment of the disclosure, which is applied to a user equipment (UE) of wireless communication. FIG. 7 is a structural schematic diagram of a data transmission apparatus 100 according to an embodiment of the disclosure. As shown in FIG. 7, the apparatus 100 includes: a communication module 110.

The first communication module 110 is configured to, in response to first physical uplink shared channel (PUSCH) resources being with a first priority, maintain downlink communication with a serving cell within a first duration after an end moment of the first PUSCH resources.

The first duration is a duration from the end moment of the first PUSCH resources to an end moment of a predetermined downlink control information (DCI) monitoring occasion.

The predetermined DCI monitoring occasion is a first DCI monitoring occasion after a second duration separated from the end moment of the first PUSCH resources.

In an embodiment, the second duration is greater than or equal to a duration for which a base station demodulates data transmitted by the first PUSCH resources.

In an embodiment, the apparatus 100 further includes: a receiving module 120, configured to receive the second duration sent by a base station; or a first acquiring module 130, configured to acquire the second duration specified by negotiation or agreement in advance.

In an embodiment, the first PUSCH resources include: first PUSCH resources of newly transmitted data that is scheduled by an uplink (UL) grant and is monitored at a DCI monitoring occasion; or first PUSCH resources of retransmission data that is scheduled by a UL grant and is monitored at a DCI monitoring occasion.

In an embodiment, the apparatus 100 further includes: a measurement module 140. The measurement module 140 is configured to in response that the end moment of the predetermined DCI monitoring occasion is within the measurement gap and has not yet reached the end moment of the measurement gap, perform inter-frequency signal measurement between the end moment of the predetermined DCI monitoring occasion and the end moment of the measurement gap.

In an embodiment, the measurement module 140 includes: a measurement sub-module 141. The measurement sub-module 141 is configured to perform inter-frequency signal measurement between the end moment of the predetermined DCI monitoring occasion and the end moment of the measurement gap in response to a time difference between the end moment of the predetermined DCI monitoring occasion and the end moment of the measurement gap being greater than a third duration.

In an embodiment, the apparatus 100 further includes: a second communication module 150. The second communication module 150 is configured to maintain downlink communication with the serving cell between the end moment of the predetermined DCI monitoring occasion and the end moment of the measurement gap, in response to determining that a time difference between the end moment of the predetermined DCI monitoring occasion and the end moment of the measurement gap is less than or equal to a third duration.

In an embodiment, the third duration is greater than or equal to a duration of the UE performing inter-frequency handover for two times.

Figure 8:
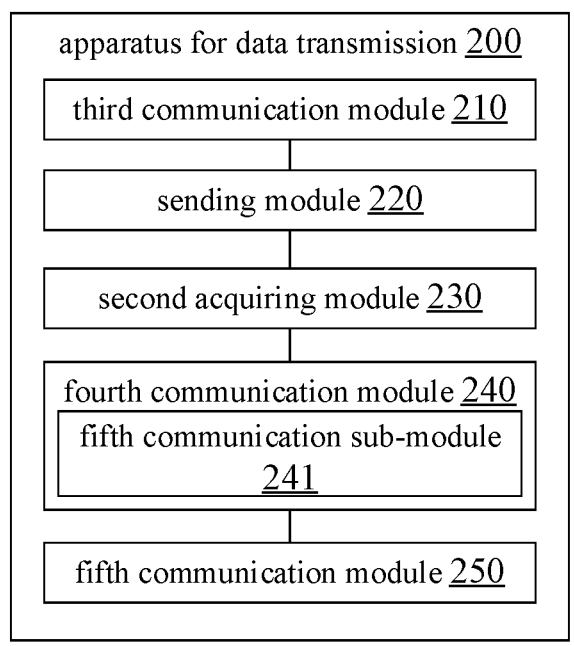
FIG. 8 is a structural block diagram illustrating the composition of another apparatus for data transmission according to an embodiment.

A data transmission apparatus is further provided according to an embodiment of the disclosure, which is applied to a base station of wireless communication. FIG. 8 is a structural schematic diagram of a data transmission apparatus 200 according to an embodiment of the disclosure. As shown in FIG. 8, the apparatus 200 includes: a third communication module 210.

The third communication module 210 is configured to, in response to first physical uplink shared channel (PUSCH) resources being with a first priority, maintain downlink communication with a user equipment (UE) in a serving cell within a first duration after an end moment of the first PUSCH resources.

The first duration is a duration from the end moment of the first PUSCH resources to an end moment of a predetermined downlink control information (DCI) monitoring occasion.

The predetermined DCI monitoring occasion is a first DCI monitoring occasion after a second duration separated from the end moment of the first PUSCH resources.

In an embodiment, the second duration is greater than or equal to a duration for which a base station demodulates data transmitted by the first PUSCH resources.

In an embodiment, the apparatus 200 further includes: a sending module 220, configured to send the second duration to the UE; or a second acquiring module 230, configured to acquire the second duration specified by negotiation or agreement in advance.

In an embodiment, the first PUSCH resources include: first PUSCH resources of newly transmitted data that is scheduled by an uplink (UL) grant sent at a DCI monitoring occasion; or first PUSCH resources of retransmission data that is scheduled by the UL grant sent at the DCI monitoring occasion.

In an embodiment, the apparatus 200 further includes: a fourth communication module 240. The fourth communication module 240 is configured to in response that the end moment of the predetermined DCI monitoring occasion is within the measurement gap and has not yet reached the end moment of the measurement gap, interrupt the downlink communication with the UE in the serving cell between the end moment of the predetermined DCI monitoring occasion and the end moment of the measurement gap.

In an embodiment, the fourth communication module 240 includes: a fifth communication sub-module 241. The fifth communication sub-module 241 is configured to interrupt the downlink communication with the UE in the serving cell between the end moment of the predetermined DCI monitoring occasion and the end moment of the measurement gap, in response to a time difference between the end moment of the predetermined DCI monitoring occasion and the end moment of the measurement gap being greater than a third duration.

In an embodiment, the apparatus 100 further includes: a fifth communication module 250. The fifth communication module 250 is configured to maintain downlink communication with the UE in the serving cell between the end moment of the predetermined DCI monitoring occasion and the end moment of the measurement gap, in response that a time difference between the end moment of the predetermined DCI monitoring occasion and the end moment of the measurement gap is less than or equal to a third duration.

In an embodiment, the third duration is greater than or equal to a duration of the UE performing inter-frequency handover for two times.

In an embodiment, the first communication module 110, the receiving module 120, the first acquiring module 130, the measurement module 140, the second communication module 150, the third communication module 210, the sending module 220, the second acquiring module 230, the fourth communication module 240 and the fifth communication module 250 and the like may be implemented by one or more central processing units (CPUs), graphics processing units (GPUs), baseband processors (BPs), application specific integrated circuits (ASICs), digital signal processors (DSPs), programmable logic devices (PLDs), complex programmable logic devices (CPLDs), field-programmable gate arrays (FPGAs), general-purpose processors, controllers, micro controller units (MCUs,), microprocessors, or other electronic components, for executing the aforementioned methods.

Figure 9:
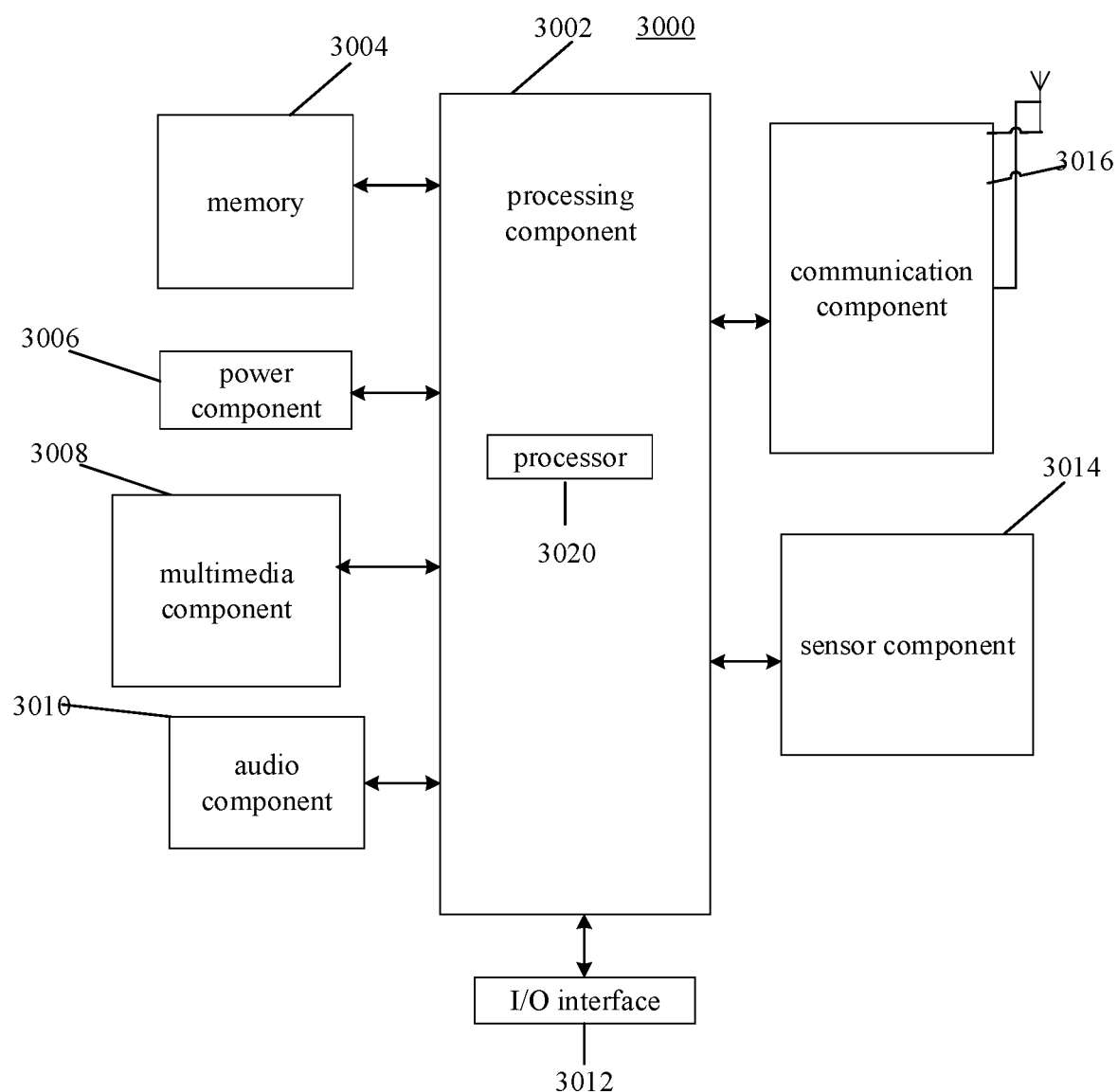
FIG. 9 is a block diagram of a device for data transmission according to an embodiment.

FIG. 9 is a block diagram of a device 3000 for data transmission according to an embodiment. For example, the device 3000 may be a mobile phone, a computer, a digital broadcast terminal, a messaging device, a game console, a tablet device, a medical device, a fitness device, a personal digital assistant, or the like.

Referring to FIG. 9, the device 3000 may include one or more of the following components: a processing component 3002, a memory 3004, a power component 3006, a multimedia component 3008, an audio component 3010, an input/output (I/O) interface 3012, a sensor component 3014, and a communication component 3016.

The processing component 3002 generally controls overall operations of the device 3000, such as the operations associated with display, phone calls, data communications, camera operations, and recording operations. The processing component 3002 may include one or more processors 3020 to execute instructions to perform all or some of the steps of the methods described above. Moreover, the processing component 3002 may include one or more modules that facilitate interactions between the processing component 3002 and other components. For example, the processing component 3002 may include a multimedia module to facilitate interactions between the multimedia component 3008 and the processing component 3002.

The memory 3004 is configured to store various types of data to support operation of the device 3000. Examples of such data include instructions for any application or method operating on the device 3000, contact data, phonebook data, messages, pictures, videos, and the like. The memory 3004 may be implemented by any type of volatile or nonvolatile storage device or their combination, such as a static random-access memory (SRAM), an electrically-erasable programmable read only memory (EEPROM), an erasable programmable read only memory (EPROM), a programmable read only memory (PROM), a read only memory (ROM), a magnetic memory, a flash memory, a magnetic or optical disk.

The power component 3006 provides power to various components of the device 3000. The power component 3006 may include a power management system, one or more power sources, and any other components associated with the generation, management, and distribution of power in the device 3000.

The multimedia component 3008 includes a screen providing an output interface between the device 3000 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a duration and a pressure associated with the touch or swipe action. In some embodiments, the multimedia component 3008 includes a front-facing camera and/or a rear-facing camera. When the device 3000 is in an operating mode, such as a shooting mode or a video mode, the front-facing camera and/or the rear-facing camera can receive external multimedia data. Each front-facing camera and rear-facing camera may be a fixed optical lens system or has focal length and optical zoom capability.

The audio component 3010 is configured to output and/or input audio signals. For example, the audio component 3010 includes a microphone (MIC for short) that is configured to receive external audio signals when the device 3000 is in an operating mode, such as a call mode, a recording mode, and a voice recognition mode. The received audio signal may be further stored in the memory 3004 or transmitted via the communication component 3016. In some embodiments, the audio component 3010 also includes a speaker for outputting audio signals.

The I/O interface 3012 provides an interface between the processing component 3002 and peripheral interface modules, such as a keyboard, a click wheel, buttons, and the like. The buttons may include, but are not limited to, a home button, a volume button, a starting button, and a locking button.

The sensor component 3014 includes one or more sensors to provide status assessments of various aspects of the device 3000. For instance, the sensor component 3014 may detect an open/closed status of the device 3000, relative positioning of components, e.g., the display and the keypad, of the device 3000, a change in position of the device 3000 or a component of the device 3000, a presence or absence of user contact with the device 3000, an orientation or an acceleration/deceleration of the device 3000, and a change in temperature of the device 3000. The sensor component 3014 may include a proximity sensor configured to detect the presence of nearby objects without any physical contact. The sensor component 3014 may also include a light sensor, such as a complementary metal oxide semiconductor (CMOS) or a charge-coupled device (CCD) image sensor, for use in imaging applications. In some embodiments, the sensor component 3014 may also include an accelerometer sensor, a gyroscope sensor, a magnetic sensor, a pressure sensor, or a temperature sensor.

The communication component 3016 is configured to facilitate communication, wired or wirelessly, between the device 3000 and other devices. The device 3000 can access a wireless network based on a communication standard, such as WiFi, 2G, or 3G, or their combination. In an embodiment, the communication component 3016 receives a broadcast signal or broadcast associated information from an external broadcast management system via a broadcast channel. In an embodiment, the communication component 3016 further includes a near field communication (NFC) module to facilitate short-range communications. For example, the NFC module may be implemented based on a radio frequency identification (RFID) technology, an infrared data association (IrDA) technology, an ultra-wide band (UWB) technology, a Bluetooth (BT) technology, and other technologies.

In embodiments, the device 3000 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described method.

In embodiments, there is also provided a non-transitory computer readable storage medium including instructions, such as included in the memory 3004, executable by the processor 3020 in the device 3000, for performing the above method. For example, the non-transitory computer readable storage medium may be a ROM, a random access memory (RAM), a CD-ROM, a magnetic tape, a floppy disc, an optical data storage device, and the like.

Those skilled in the art will be aware of other implementations of the embodiments of the disclosure after considering the specification and practicing the disclosure disclosed herein. The disclosure is intended to cover any variations, uses, or adaptive changes of embodiments of the disclosure, which follow the general principles of embodiments of the disclosure and include common knowledge or conventional technical means in the technical field not disclosed herein. The description and the embodiments are to be regarded as exemplary, and the true scope of embodiments of the disclosure are indicated in the following claims.

It should be understood that embodiments of the present disclosure is not limited to the precise structures described above and illustrated in the accompanying drawings, and that various modifications and changes may be made without departing from its scope. The scope of embodiments of the present disclosure is limited by the appended claims.

The invention claimed is:

1. A method for data transmission, comprising:
   in response to first physical uplink shared channel (PUSCH) resources being with a first priority, maintaining by a user equipment (UE), downlink communication with a serving cell within a first duration after an end moment of the first PUSCH resources;
   wherein the first duration is a duration from the end moment of the first PUSCH resources to an end moment of a predetermined downlink control information (DCI) monitoring occasion, and
   the predetermined DCI monitoring occasion is a first DCI monitoring occasion after a second duration separated from the end moment of the first PUSCH resources;
   wherein the method further comprises: in response that the end moment of the predetermined DCI monitoring occasion is within a measurement gap and has not yet reached the end moment of the measurement gap, performing inter-frequency signal measurement between the end moment of the predetermined DCI monitoring occasion and the end moment of the measurement gap.

2. The method as claimed in claim 1, wherein the second duration is greater than or equal to a duration for which a base station demodulates data transmitted by the first PUSCH resources.

3. The method as claimed in claim 1, further comprising one of:
   receiving by the UE, the second duration sent by a base station; and
   acquiring by the UE, the second duration specified by negotiation or agreement in advance.

4. The method as claimed in claim 1, wherein the first PUSCH resources comprise one of:
   first PUSCH resources of newly transmitted data that is scheduled by an uplink (UL) grant and is monitored at a DCI monitoring occasion; and
   first PUSCH resources of retransmission data that is scheduled by a UL grant and is monitored at a DCI monitoring occasion.

5. The method as claimed in claim 1, wherein performing inter-frequency signal measurement between the end moment of the predetermined DCI monitoring occasion and the end moment of the measurement gap, comprises:
   in response to a time difference between the end moment of the predetermined DCI monitoring occasion and the end moment of the measurement gap being greater than a third duration, performing inter-frequency signal measurement between the end moment of the predetermined DCI monitoring occasion and the end moment of the measurement gap.

6. The method as claimed in claim 1, further comprising:
   in response to determining that a time difference between the end moment of the predetermined DCI monitoring occasion and the end moment of the measurement gap is less than or equal to a third duration, maintaining downlink communication with the serving cell between the end moment of the predetermined DCI monitoring occasion and the end moment of the measurement gap.

7. The method as claimed in claim 5, wherein
the third duration is greater than or equal to a duration of the UE performing inter-frequency handover for two times.

8. A method for data transmission, comprising:
in response to first physical uplink shared channel (PUSCH) resources being with a first priority, maintaining by a base station, downlink communication with a user equipment (UE) in a serving cell within a first duration after an end moment of the first PUSCH resources;
wherein the first duration is a duration from the end moment of the first PUSCH resources to an end moment of a predetermined downlink control information (DCI) monitoring occasion, and the predetermined DCI monitoring occasion is a first DCI monitoring occasion after a second duration separated from the end moment of the first PUSCH resources;
wherein the method further comprises: in response that the end moment of the predetermined DCI monitoring occasion is within a measurement gap and has not yet reached the end moment of the measurement gap, interrupting the downlink communication with the UE in the serving cell between the end moment of the predetermined DCI monitoring occasion and the end moment of the measurement gap.

9. The method as claimed in claim 8, wherein the second duration is greater than or equal to a duration for which the base station demodulates data transmitted by the first PUSCH resources.

10. The method as claimed in claim 8, further comprising one of:
sending by the base station, the second duration to the UE; and
acquiring by the base station, the second duration specified by negotiation or agreement in advance.

11. The method as claimed in claim 8, wherein the first PUSCH resources comprise one of:
first PUSCH resources of newly transmitted data that is scheduled by an uplink (UL) grant sent at a DCI monitoring occasion; and
first PUSCH resources of retransmission data that is scheduled by the UL grant sent at the DCI monitoring occasion.

12. The method as claimed in claim 8, wherein interrupting the downlink communication with the UE in the serving cell between the end moment of the predetermined DCI monitoring occasion and the end moment of the measurement gap, comprises:
in response to a time difference between the end moment of the predetermined DCI monitoring occasion and the end moment of the measurement gap being greater than a third duration, interrupting the downlink communication with the UE in the serving cell between the end moment of the predetermined DCI monitoring occasion and the end moment of the measurement gap.

13. The method as claimed in claim 8, further comprising:
in response to determining that a time difference between the end moment of the predetermined DCI monitoring occasion and the end moment of the measurement gap is less than or equal to a third duration, maintaining downlink communication with the UE in the serving cell between the end moment of the predetermined DCI monitoring occasion and the end moment of the measurement gap.

14. The method as claimed in claim 12, wherein
the third duration is greater than or equal to a duration of the UE performing inter-frequency handover for two times.

15. A communication device, comprising:
a processor; and
a non-transitory computer-readable storage medium coupled to the processor and storing programming instructions for execution by the processor, the programming instructions instructing the processor to:
in response to first physical uplink shared channel (PUSCH) resources being with a first priority, maintaining downlink communication with a serving cell within a first duration after an end moment of the first PUSCH resources;
wherein the first duration is a duration from the end moment of the first PUSCH resources to an end moment of a predetermined downlink control information (DCI) monitoring occasion, and
the predetermined DCI monitoring occasion is a first DCI monitoring occasion after a second duration separated from the end moment of the first PUSCH resources;
wherein the programming instructions further instruct the processor to: in response that the end moment of the predetermined DCI monitoring occasion is within a measurement gap and has not yet reached the end moment of the measurement gap, perform inter-frequency signal measurement between the end moment of the predetermined DCI monitoring occasion and the end moment of the measurement gap.

16. The device as claimed in claim 15, wherein performing inter-frequency signal measurement between the end moment of the predetermined DCI monitoring occasion and the end moment of the measurement gap, comprises:
in response to a time difference between the end moment of the predetermined DCI monitoring occasion and the end moment of the measurement gap being greater than a third duration, performing inter-frequency signal measurement between the end moment of the predetermined DCI monitoring occasion and the end moment of the measurement gap.

17. The device as claimed in claim 15, further comprising:
in response to determining that a time difference between the end moment of the predetermined DCI monitoring occasion and the end moment of the measurement gap is less than or equal to a third duration, maintaining downlink communication with the serving cell between the end moment of the predetermined DCI monitoring occasion and the end moment of the measurement gap.

* * * * *